United States Patent

[11] 3,556,054

| [72] | Inventors | Lyle J. Honegger<br>Fairbury;<br>N. Keith Newtson, Forrest; Joseph S. Stevenson, Fairbury, Ill. |
|---|---|---|
| [21] | Appl. No. | 741,543 |
| [22] | Filed | July 1, 1968 |
| [45] | Patented | Jan. 19, 1971 |
| [73] | Assignee | Thrive Center, Inc.<br>Chicago, Ill.<br>a corporation of Illinois. by mesne assignment |

[54] MOVABLE ANIMAL HOUSE
11 Claims, 5 Drawing Figs.

[52] U.S. Cl. .................................................... 119/16,
210/219; 261/92
[51] Int. Cl. ..................................................... A01k 01/00,
F24f 07/06
[50] Field of Search ........................................... 119/16, 28,
14.03, 14.11; 210/219; 261/92, 123

[56] References Cited
UNITED STATES PATENTS

| 2,934,325 | 4/1960 | Haglund ..................... | 261/92 |
| 3,345,744 | 10/1967 | Collins ....................... | 31/47 |
| 3,452,873 | 7/1969 | Blough ........................ | 210/219 |
| 3,019,763 | 2/1962 | Ferris ......................... | 119/14.03 |
| 3,224,414 | 12/1965 | Conover ..................... | 119/28 |
| 3,225,739 | 12/1965 | Brodrick ..................... | 119/28X |
| 3,229,663 | 1/1966 | Conover ..................... | 119/16 |

Primary Examiner—Aldrich F. Medbery
Attorney—Merriam, Marshall, Shapiro and Klose ABSTRACT: House for swine, cattle, poultry, etc., with facilities for feeding, watering and sheltering. Movable from site to site. Self-contained oxidation ditch and aeration device for treating animal manure. Vapors generated during aeration of contents of oxidation tank are prevented from dispersing into animal housing area. Accumulation of sludge in corner of rectangular oxidation tank is prevented.

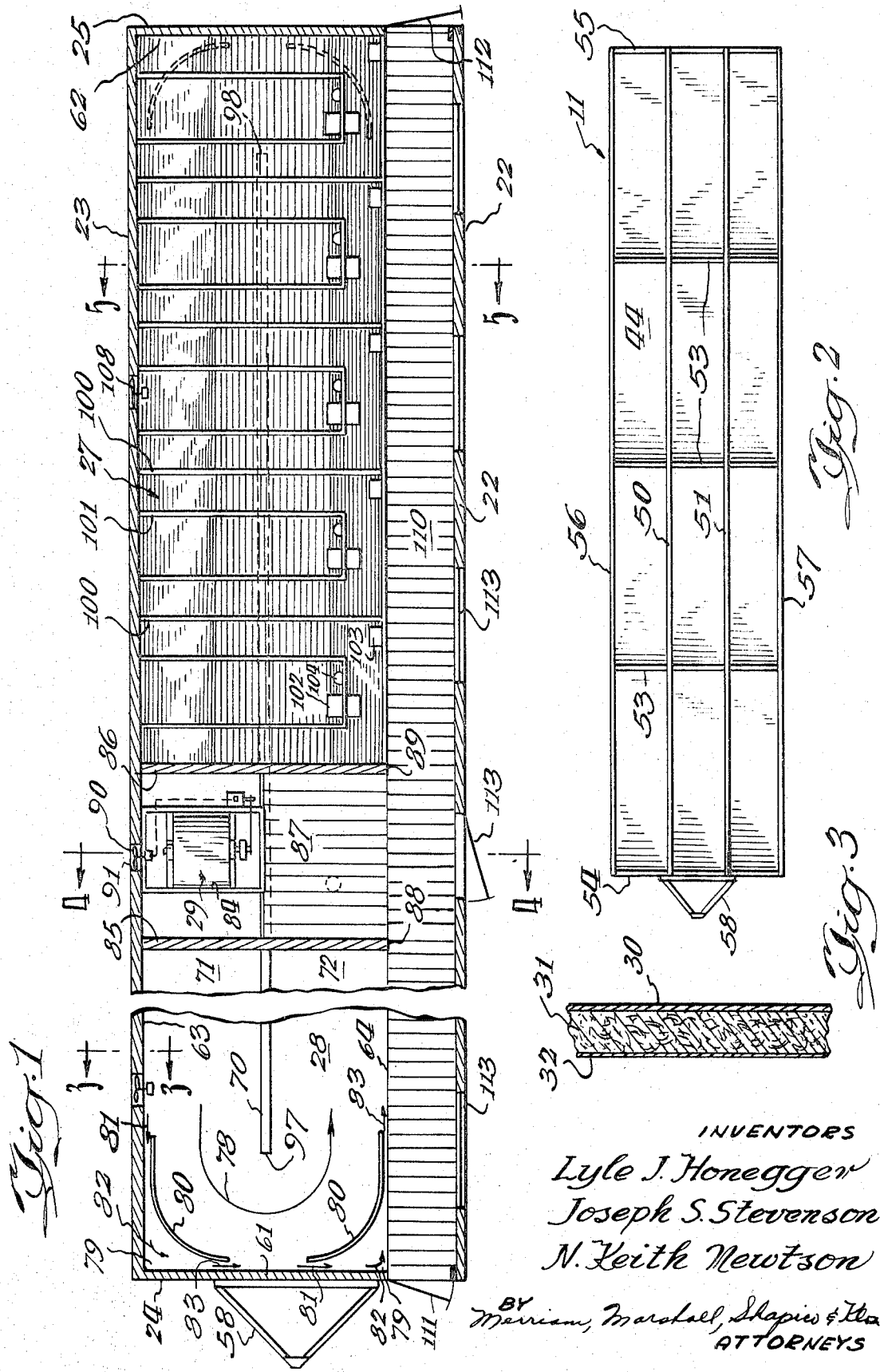

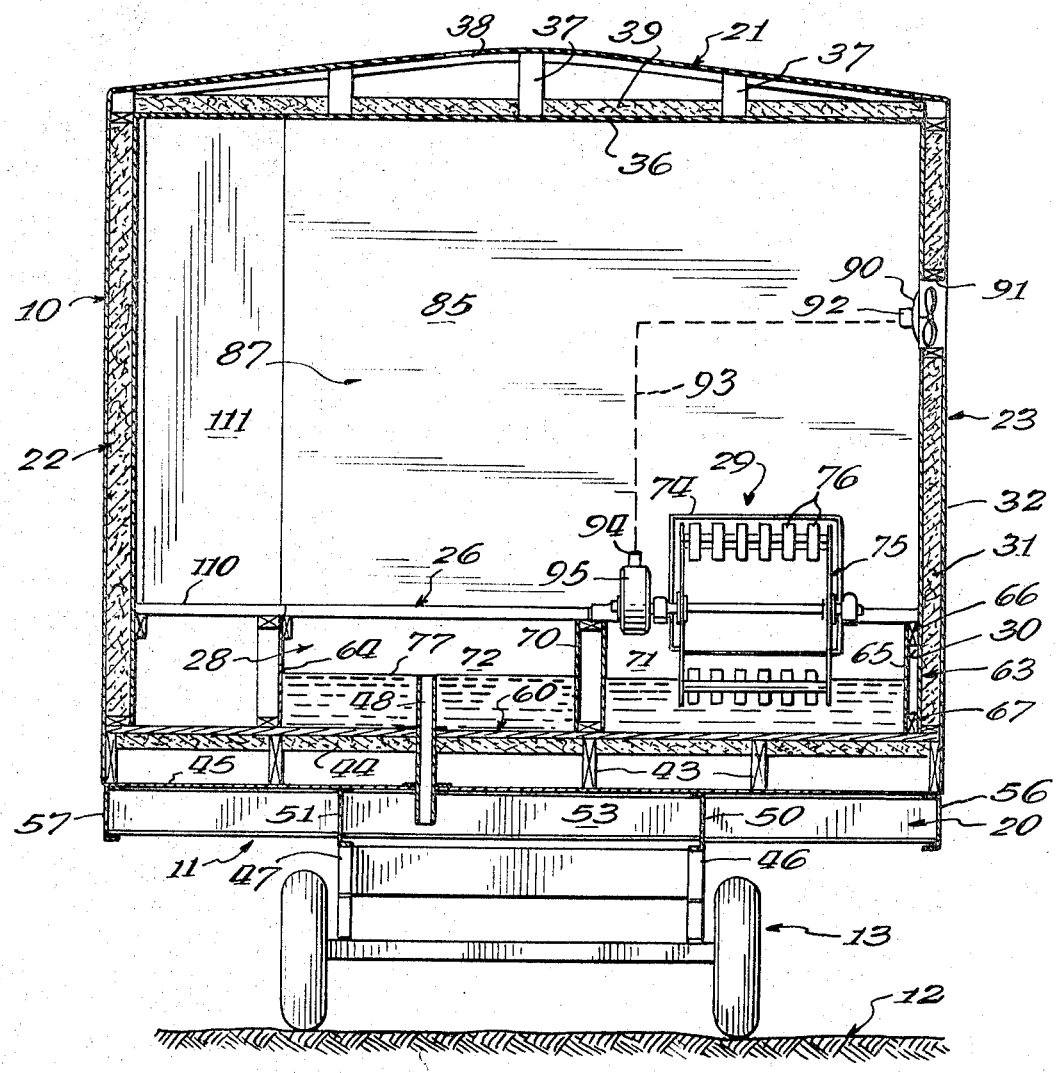

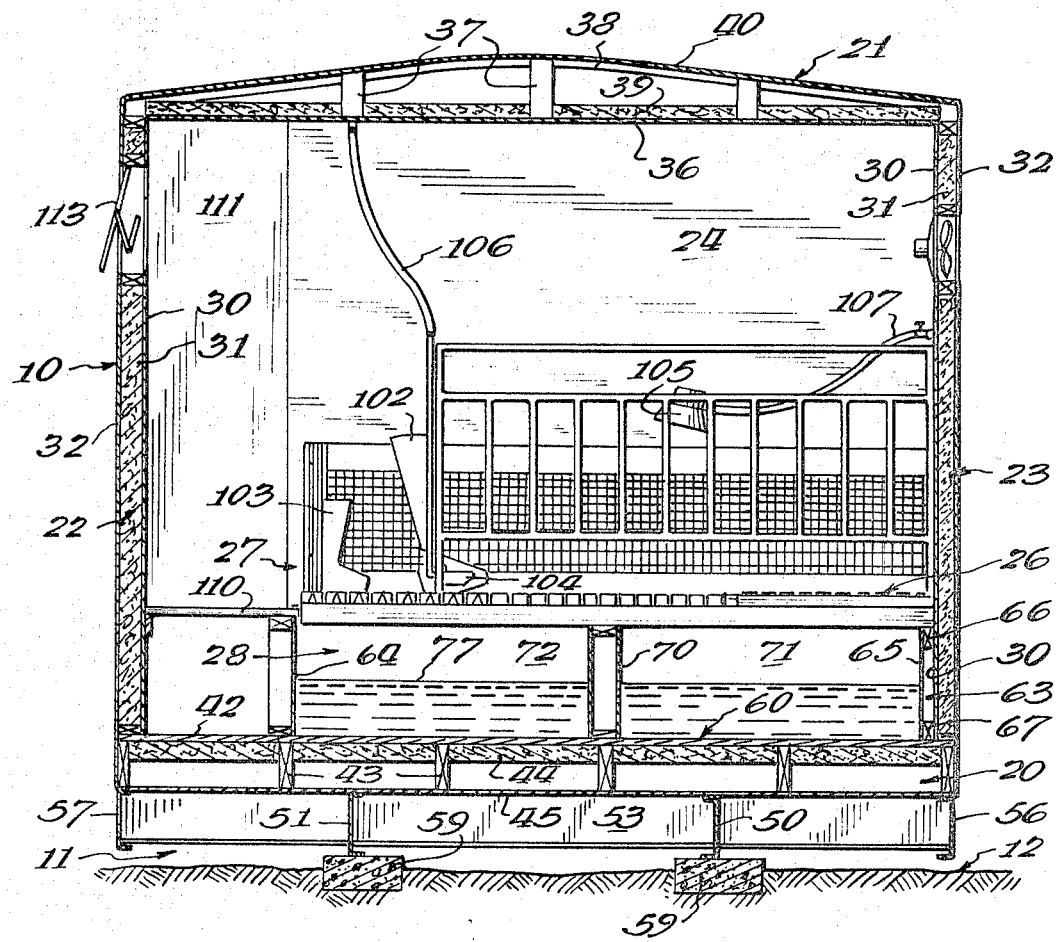

MOVABLE ANIMAL HOUSE

BACKGROUND OF THE INVENTION

The present invention relates generally to a movable house for animals. As used herein, the term animal is broad enough to include poultry and other birds, farm animals such as cattle and swine and other types of animals.

Conventional animal houses are often constructed with slatted floors for permitting manure and urine from the housed animals to drop through the floor into an underlying oxidation ditch containing liquid and provided with means for aerating the contents of the oxidation ditch to render the contents biologically inoffensive. The oxidation ditch is conventionally below ground level and lined with concrete, thus requiring excavation and concrete work and restricting the construction and installation of the type of housing to warm weather. Moreover, by its very nature, this type of conventional animal house cannot be moved from site to site or from farm to farm or sold independently of the land on which it is erected, nor is it so intended.

SUMMARY OF THE INVENTION

All of the above described drawbacks inherent in conventional housing for animals are eliminated by the movable animal house constructed in accordance with the present invention. This movable animal house comprises a shell, a floor inside the shell and an open-top oxidation tank or ditch carried and supported by the movable house and underlying the floor.

The entire house is mounted on an underlying frame which supports the movable animal house on a stationary surface and also removably mounts the entire animal house on a running gear for movement from site to site. Because of the movable nature of the house, it may be sold independently of the real estate on which it rests at any given time or it may be moved with the owner from one farm to another. Because the movable house includes a self-contained oxidation tank, excavation and concrete work are not necessary, and the animal house may be installed during any season, including winter.

The house is also equipped with apparatus for preventing vapors, generated during aeration of the liquid in the oxidation tank, from accumulating in the animal housing area of the structure; and the oxidation tank is equipped with a device for preventing sludge from accumulating in the corners of the tank.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIG. 1 is a plan view of segments of a movable animal house constructed in accordance with an embodiment of the present invention;

FIG. 2 is a bottom view, in reduced scale, of the movable animal house of FIG. 1;

FIG. 3 is an enlarged sectional view taken along line 3–3 of FIG. 1 and shows a section of a wall of the movable animal house;

FIG. 4 is an enlarged vertical sectional view taken along line 4–4 of FIG. 1 and shows the movable animal house mounted on a running gear;

FIG. 5 is an enlarged vertical sectional view taken along line 5–5 of FIG. 1 and shows the animal house resting on the ground.

DESCRIPTION OF THE PREFERRED EMBODIMENT

Referring initially to FIGS. 1, 4 and 5, there is shown an embodiment of a movable animal house constructed in accordance with the present invention. The house has complete facilities for feeding, watering and sheltering the animals. The house comprises a shell 10 permanently mounted atop an underframe 11 for supporting the shell on a stationary surface 12 (FIG. 5) and for removably mounting shell 10 on a running gear 13 (FIG. 4) for transporting the shell between sites.

Shell 10 includes a bottom 20, a roof 21, a pair of sidewalls 22, 23 and a pair of end walls 24, 25 (FIG. 1). Located inside shell 10 is a floor 26 spaced above shell bottom 20. On a portion of the floor is an animal housing area indicated generally at 27 (FIGS. 1 and 5). Underlying the totality of animal housing area 27 of floor 26 is an elongated open-top oxidation tank 28 located on shell bottom 20. The vertical spacing between the animal housing area of the floor and shell bottom 20 is at least the vertical dimension of oxidation tank 28.

The entire floor in animal housing area 27 is composed of spaced-apart slats, or is otherwise provided with openings, to permit urine and manure from animals housed in animal housing area 27 to drop through the floor into underlying oxidation tank 28 which contains liquid and receives and holds the manure and urine. Associated with oxidation tank 28 is aerating means 29, typically a rotor for beating air into the tank liquid, to aerate the contents of the tank and render the manure in the tank biologically inoffensive.

Shell sidewalls 22, 23 and shell end walls 24, 25 each have essentially the same multilayer construction illustrated in FIG. 3. Each wall has an interior layer 30 and an exterior layer 32, between which is located a layer of thermal insulating material 31. Typically, interior layer 30 may be plywood, exterior layer 32 may be sheet metal such as aluminum, and the layer of insulating material 31 may be fiberglas.

Roof 21 of shell 10 is also of multilayer construction comprising an interior layer 36 suspended from a roof truss having web members 37 and an upper stringer 38 (FIGS. 4 and 5). The truss is covered by an exterior roof layer 40; and a layer of thermal insulating material 39 lies atop interior roof layer 36. Roof interior layer 36 may be plywood, exterior layer 40 may be sheet metal such as aluminum, and insulating material 39 may be fiberglass.

Shell bottom 20 also has multilayer construction comprising an interior layer 42 supported atop frame member 43 resting on an exterior layer 45. A lining of thermal insulating material 44 is located next to interior layer 42. Interior layer 42 may be composed of plywood, exterior layer 45 may be composed of sheet metal such as aluminum, and insulating layer 44 may be composed of fiberglass.

Shell 10 has a substantially rectangular cross section (FIG. 1); and the periphery of underframe 11 is also rectangular. The totality of tank 28 is immovably confined within insulated shell 10.

Referring to FIGS. 2, 4 and 5, underframe 11 includes a pair of longitudinally extending central beams 50, 51 which provide the main support for shell 10, a plurality of laterally extending interior crossmembers 53, laterally extending front and rear end members 54, 55 respectively, and longitudinally extending side beams 56, 57. A hitch 58 is detachably secured to front member 54 for use in towing the movable animal house when the shell is mounted atop running gear 13. As shown in FIG. 5, central beams 50, 51 are deeper than and extend slightly lower than side beams 56, 57; and central beams 50, 51 rest on a stationary surface when the movable house is at its intended site. In FIG. 5, beams 50, 51 are shown resting on conventional concrete patio blocks 59. In other instances, beams 50, 51 may rest directly on the ground. A permanent concrete foundation is not required.

When underframe 11 is removably mounted atop running gear 13, beams 50, 51 rest atop running gear frame members 46, 47 (FIG. 4). Underframe beams 50, 51 may be secured to running gear frame members 46, 47 during transportation of the animal house with bolts or other detachable fasteners (not shown). When the movable animal house has been towed to a desired site, the bolts are disconnected, jacks (not shown) are placed beneath underframe 11, e.g. beneath side beams 56, 57, the entire movable house is raised by the jacks, the running gear is removed from beneath the movable house, the jacks are lowered until the underframe rests on the ground or other stationary surface and the jacks are then removed. The reverse of the above described dismounting procedure may be followed when the house is to be removed from a site.

Referring to FIGS. 1, 4 and 5, oxidation tank 28 includes a bottom 60 common with a portion of shell bottom 20, a pair of end walls 61, 62 each common with a portion of a respective end wall 24, 25 of shell 10, a sidewall 63 common with sidewall 23 of shell 10, and a sidewall 64. In those areas where a shell wall or portion thereof is common with a tank wall, the interior layer of the shell wall, or shell bottom, typically composed of plywood, is lined on the interior thereof with a waterproof compound such as an asphalt compound. Sidewall 64 of tank 28, the only tank wall not common with a shell wall, is composed of plywood, for example, lined with an asphalt compound. Sidewall 63 of tank 28 includes an innermost layer 65 spaced inwardly of interior layer 30 of the common shell sidewall 23, and innermost layer 65 of tank sidewall 63 is lined on its inner surface with an asphalt compound.

The space between interior layer 30 of shell wall 23 and innermost layer 65 of tank sidewall 63 is a dead air space having a top and bottom defined by horizontally extending wooden frame members 66, 67 respectively. The dead air space further enhances the insulation along tank sidewall 63.

The tank walls and bottom and the shell walls, top and bottom are provided with sufficient thermal insulation to maintain in the tank a temperature which provides a desired level of bacterial action on the manure in the tank.

As previously noted, the entire floor of animal housing area 27 has openings through which manure may drop, and tank 28 underlies the totality of animal housing area 27. As shown in FIGS. 4 and 5, tank 28 has vertical sidewalls 64, 65 and a uniform depth along its width between the sidewalls. All of these structural features cooperate to reduce the concentration of animal manure at any point along the width of tank 28.

Extending upwardly from the middle of tank bottom 60 is a divider wall 70 extending parallel to tank sidewalls 63, 64 and having opposite ends 97, 98 spaced from tank end walls 61, 62 (FIG. 1). Wall 70 divides tank 28 into two channels 71, 72, each extending longitudinally alongside a respective sidewall 63, 64 of tank 28. Tank 28 contains a vertical overflow pipe 48 (FIG. 4).

Aerating means 29 comprises a hood 74 covering a rotor 75 having a plurality of blades 76 dipping below the surface 77 of the liquid within tank 28 during operation of the aerating means. The rotating blades not only introduce air into the liquid in tank 28 but also create a flow of current within the tank, said current moving sequentially in a first longitudinal direction in one of the channels, e.g. 71, alongside one sidewall, e.g. 63, and then in another longitudinal direction, opposite the first direction, in the other channel, e.g. 72, alongside the other sidewall, e.g. 64. The general direction of the current is shown by the arrow 78 in FIG. 1.

As shown in FIGS. 4 and 5, the floor of animal housing area 27 is devoid of projections extending downwardly toward tank 28 from the floor of the animal housing area.

As shown in FIG. 1, tank 28 has a substantially rectangular horizontal cross section. There is a tendency for liquid to be relatively quiescent or stagnant in the corners of a tank; and there is, accordingly, a likelihood that sludge and surface foam will accumulate at the corners. This would occur even if, instead of having angularly joined walls, the tank was rounded or loop-shaped at the junction of an end wall and a sidewall. Thus, as used herein, the term corner refers broadly to the junction of an end wall and a sidewall of a tank at which sludge can accumulate. The accumulation of sludge and surface foam at the corner is undesirable, and, in an embodiment of the present invention, means are provided for preventing this.

Located adjacent each corner 79 of tank 28 is a flow-directing means or vane 80 constructed of sheet metal. Each flow-directing vane 80 extends upwardly from tank bottom 60 and has a horizontal cross section which is substantially asymptotic to corner 79. Flow-directing vane 80 causes part of the current to flow along the path defined by arrows 81, 82, 83 in sequence; and this provides turbulence at corner 79 to prevent the accumulation of sludge at the corner.

In the illustrated embodiment, aerating means 29 is supported at approximately the level of floor 26 of shell 10 and is located approximately halfway between shell end walls 24, 25. Typically, a portion of animal housing area 27 would be located on each side of aerating means 29.

Aerating rotor 75 extends downwardly into tank 28 through an opening 84 in floor 26 (FIG. 1). As shown in FIG. 4, aeration rotor 75 extends axially along the width of tank 28 in channel 71, and that part of the width of channel 71 which is not occupied by rotor 75 is substantially as wide as that part of the width of channel 71 which is occupied by rotor 75. Operation of rotor 75 generates vapors from the liquid in tank 28; and these vapors, which can be foul smelling and undesirable, enter the area above aerating means 29 by passing upwardly through the space between the periphery of opening 84 and the outside of aerating means 29.

To prevent the dispersion of these undesirable vapors from the area about the aerating means to animal housing area 27, the movable animal house is provided with a pair of partitions 85, 86 extending vertically from floor 26 to interior layer 36 of the shell roof. These two partitions 85, 86 and that portion of shell sidewall 23 between the two partitions define three sides of an aeration area 87, the fourth side of which is defined by the ends 88, 89 of partitions 85, 86 respectively. In the illustrated embodiment, the space between partition ends 88, 89 is not closed off by a wall, although such a wall could be provided in accordance with another embodiment of the present invention.

As previously indicated, partitions 85, 86 confine the undesirable vapors to aeration area 87. These vapors are exhausted from the aeration area to the shell exterior by a fan 90 mounted at an opening 91 in shell wall 23 at aeration area 87. Preferably, fan 90 is driven by a motor 92 electrically connected, as shown schematically by dashed line 93, to a switch 94 for operating a motor 95 which drives rotor 75. Accordingly, exhaust fan 90 is actuable in response to operation of aerating means 29.

Rotor 75 and hood 74 of aerating means 29 may be constructed in accordance with those described in the application of Keith Newtson, Ser. No. 646,333, filed June 15, 1967, now abandoned and entitled "Aeration Device."

The fittings in the animal housing area of the movable animal house are essentially those found in conventional animal houses. In the illustrated embodiment, the fittings are those of a conventional farrowing house. These include partitions 100 defining an area to be occupied by a sow and its piglets, a cage 101 for confining the sow, a feed trough 102 for the sow, a feed trough 103 for the piglets, a water trough 104 for the sow and its piglets, and a gas fueled heater 105. Water trough 104 is connected to a water line 106 communicating with an outside water source (not shown). Gas fueled heater 105 is connected to a gas line 107 communicating with an external gas source (not shown).

Located in shell sidewall 23, at spaced locations therealong, are thermostatically controlled exhaust fans 108. Extending alongside shell wall 22, and comprising part of floor 26, is a walkway 110 which may be unslotted. At opposite ends of walkway 110 are doors 111, 112, and located along walkway 110 are a plurality of spaced-apart windows 113.

In addition to exhausting air from aeration area 87, exhaust fan 90 also causes air to be drawn from animal housing area 27, through the openings in the slatted floor of this area, into underlying tank 28; and it also causes vapor to be drawn from tank 28 upwardly through opening 84 in the floor of aeration area 87. Partitions 85, 86 impede the direct drawing of air from housing area 27 to aeration area 87 during operation of fan 90. The draft thus created by operation of fan 90 passes through tank 28 causing evaporation of liquid therein and lowering the surface level of the liquid. By thus controlling the surface level of the liquid, runoff of liquid through overflow pipe 48 is reduced, and this is desirable.

The foregoing detailed description has been given for clearness of understanding only, and no unnecessary limitations should be understood therefrom as modifications will be obvious to those skilled in the art.

We claim:

1. In an animal house:
a floor;
an animal housing area occupying a portion of said floor;
an open-top tank having a pair of sidewalls and a pair of end walls and a substantially rectangular horizontal cross section, said tank underlying said animal housing area of the floor;
said floor comprising means in the animal housing area for permitting animal manure to drop through said floor;
said tank comprising means for containing liquid and for receiving animal manure dropping through said floor;
means for producing, in the liquid in said tank, a current moving sequentially in a first longitudinal direction alongside one sidewall of the tank and then in a second longitudinal direction, opposite said first direction, alongside the other of said sidewalls;
flow directing means at a corner of the tank for providing turbulence at said corner and preventing sludge from accumulating at said corner; and
said flow directing means having opposite ends, each spaced from said side and end walls of the tank and said flow directing means and said corner forming a channel having an inlet, an outlet and a convex inner side defined by the flow directing means.

2. In an animal house as recited in claim 1 wherein said flow directing means extends upwardly from the bottom of the tank and has a horizontal cross section substantially asymptotic to said corner.

3. In an animal house:
a shell having walls and a roof;
a floor;
an animal housing area occupying a first portion of said floor;
an aeration area having aeration means therein and occupying a second portion of said floor;
an elongated open-top tank underlying the animal housing area of the floor;
said floor comprising opening means in the animal housing area for permitting animal manure to drop through said floor;
said tank comprising means for containing liquid and for receiving animal manure dropping through said floor;
means, including airflow-exhaustion means at said aeration area, for reducing dispersion from said aeration area, of vapors from the liquid in said tank; and
means at said animal housing area, including the absence of projections extending downwardly from said floor toward said tank, for preventing foam from accumulating at a given location below the floor of the animal housing area.

4. In an animal house as recited in claim 3:
means, comprising an aeration rotor, located inside said shell at said aeration area for aerating the contents of the tank;
said aerating means, during operation thereof, generating said vapors in the aeration area from the liquid in said tank;
said means for reducing dispersion of vapors from said aeration area to the housing area comprising vapor confining means; and
said airflow-exhausting flow means at said aeration area comprising means for exhausting and removing said vapors from the aeration area to the exterior of the shell.

5. In an animal house as recited in claim 4 wherein said vapor confining means comprises partition means located between said aerating means and said housing area and defining said aeration area within said shell about the aerating means.

6. In an animal house as recited in claim 4 wherein said vapor exhausting means comprises an exhaust fan, in said aeration area, communicating with the shell exterior and actuable in response to operation of said aerating means.

7. In an animal house as recited in claim 3:
said aeration area being separate and discrete from said animal housing area and overlying said open-top tank;
opening means in the floor at said aeration area for permitting vapors from the tank to enter said aeration area;
partition means separating said aeration area from the animal housing area; and
said means for exhausting an airflow comprising means for drawing air from the animal housing area to the tank and means for drawing vapor from the tank to said aeration area and means for exhausting vapors from said aeration area to the exterior of the shell.

8. In an animal house as recited in claim 3:
said shell being elongated and having a bottom;
an underframe permanently attached to the bottom of said shell;
said underframe including means for supporting said shell on a stationary surface and for removably mounting said shell on a running gear for transportation of the shell between sites;
said floor being inside said shell;
said tank being carried and supported by the house;
thermal insulation means on all of said shell walls, on said shell roof and on said shell bottom; and
the totality of said tank being immovably confined within said insulated shell.

9. A movable house as recited in claim 8 wherein:
said tank and said floor of the animal housing area include means cooperating to reduce the concentration of animal manure at any point along the width of said tank;
said open-top tank underlies the totality of said animal housing area; and
the totality of said animal housing area includes said opening means.

10. An animal house as recited in claim 3 wherein said airflow-exhausting means comprises fan means for passing an airflow below said floor along the length of said tank toward said aeration area.

11. An animal house as recited in claim 3 and comprising:
an aeration rotor at said aeration area and extending axially along the width of said tank in a channel thereof; and
that part of the width of said channel not occupied by the rotor being substantially as wide as that part of the width of said channel occupied by said rotor.